US008468686B2

(12) United States Patent
Ponzio et al.

(10) Patent No.: US 8,468,686 B2
(45) Date of Patent: Jun. 25, 2013

(54) APPARATUS FOR TERMINATING LEADS OF PLURAL WIRES IN DYNAMO ELECTRIC MACHINE CORE

(75) Inventors: Massimo Ponzio, Florence (IT); Gianfranco Stratico, Siena (IT); Rubino Corbinelli, Loc. Staggia Senese-Poggibonsi (IT); Paolo Nesti, Florence (IT)

(73) Assignee: ATOP S.p.A., Barberino Val d'Elsa (IT)

( * ) Notice: Subject to any disclaimer, the term of this patent is extended or adjusted under 35 U.S.C. 154(b) by 1022 days.

(21) Appl. No.: 12/312,088

(22) PCT Filed: Nov. 5, 2007

(86) PCT No.: PCT/EP2007/009561
§ 371 (c)(1), (2), (4) Date: Apr. 24, 2009

(87) PCT Pub. No.: WO2008/055636
PCT Pub. Date: May 15, 2008

(65) Prior Publication Data
US 2010/0043205 A1    Feb. 25, 2010

(30) Foreign Application Priority Data

Nov. 6, 2006  (IT) ................................. PI2006A0120
Aug. 3, 2007  (IT) ................................. PI2007A0090

(51) Int. Cl.
*H02K 15/00*    (2006.01)
(52) U.S. Cl.
USPC .................. 29/736; 29/596; 29/732; 29/745; 29/760
(58) Field of Classification Search
USPC .................. 29/868, 729, 736, 732, 745, 760, 29/596
See application file for complete search history.

(56) References Cited

U.S. PATENT DOCUMENTS

| 5,535,503 | A |   | 7/1996 | Newman |
|---|---|---|---|---|
| 5,613,529 | A |   | 3/1997 | Tanaka et al. |
| 6,141,864 | A | * | 11/2000 | Bugosh ............................ 29/732 |
| 2003/0089812 | A1 |   | 5/2003 | Iwase et al. |

FOREIGN PATENT DOCUMENTS

| EP | 469426 A2 * | 2/1992 |
|---|---|---|
| EP | 1 309 072 A2 | 5/2003 |
| JP | 61-049636 | 3/1986 |

(Continued)

*Primary Examiner* — Peter Vo
*Assistant Examiner* — Kaying Kue
(74) *Attorney, Agent, or Firm* — Ropes & Gray LLP; Jeffrey H. Ingerman

(57) ABSTRACT

Method and Apparatus are provided for automatically disposing plural wires along predetermined trajectories, wherein the plural wires extend from coils wound in slots of dynamoelectric machine cores. Plural wires forming leads (16', 17') are located in predetermined positions and caused to extend along predetermined directions (33,34) by means of manipulating equipment and tooling (3) which operates automatically. In addition, the equipment and tooling (3) cause the plural wires to become twisted and cut to form portions (16', 17') for connection to terminals. The tooling (3) is provided with reference surfaces (21,23) and seats (26,27) which are used to bend the plural wires along the predetermined trajectories and to provide a position constraint for the portions becoming twisted. Apparatus can be provided for positioning portions of a plurality of restraining members (103, 104) in the spacing (92, 131) existing between the bridges of the coils (14, 106, 107) and the end faces (106', 107') of a dynamo electric machine core (105). The restraining members prevent the wires of the coils heads (106, 107) from damaging the insulating lining of the core slots when a manipulator twists the leads of the coils.

14 Claims, 11 Drawing Sheets

| | FOREIGN PATENT DOCUMENTS | | JP | 11-289724 | 10/1999 |
|----|----|----|----|----|----|
| JP | 61-066550 | 4/1986 | | | |
| JP | 62-016046 | 1/1987 | * cited by examiner | | |

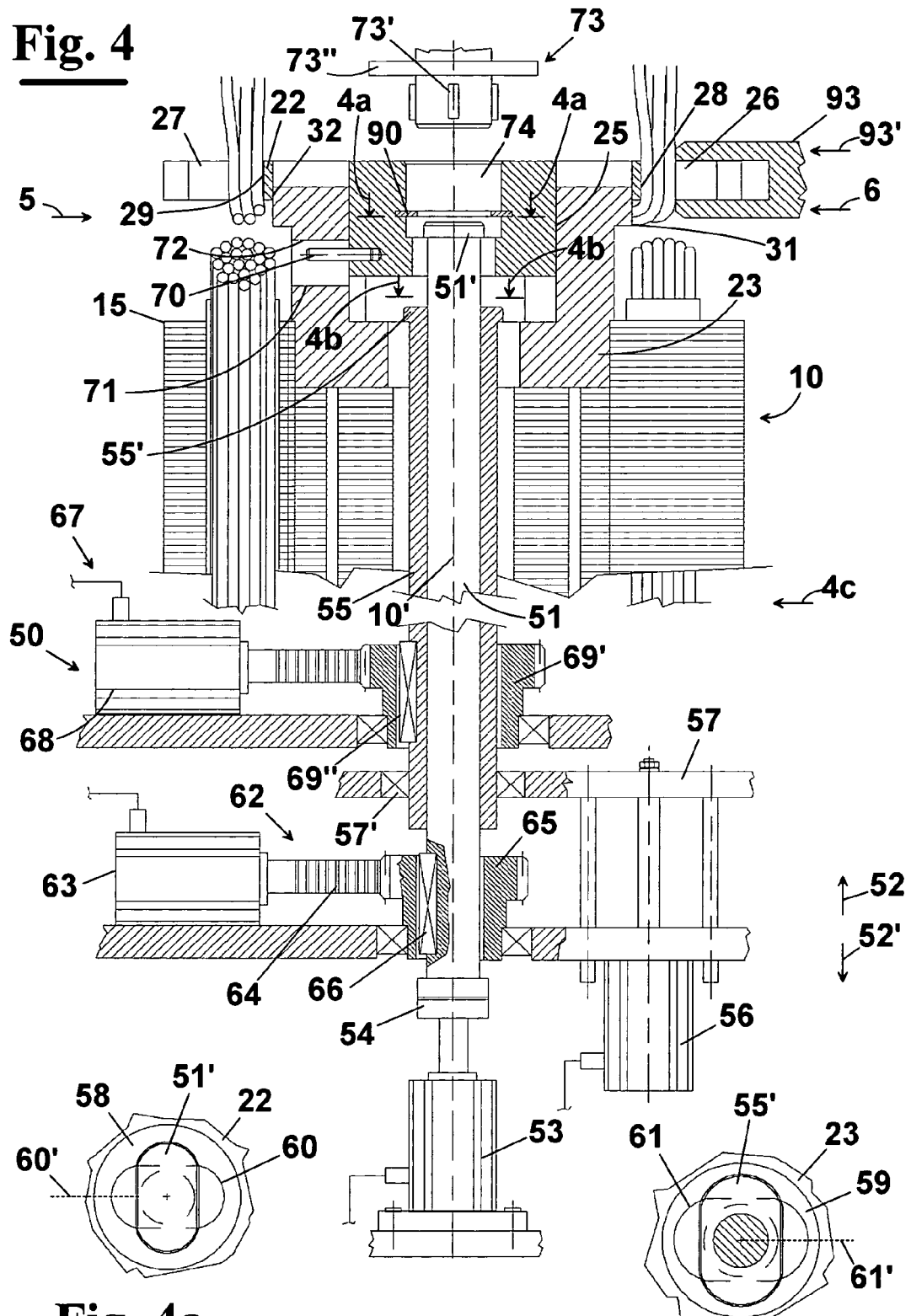

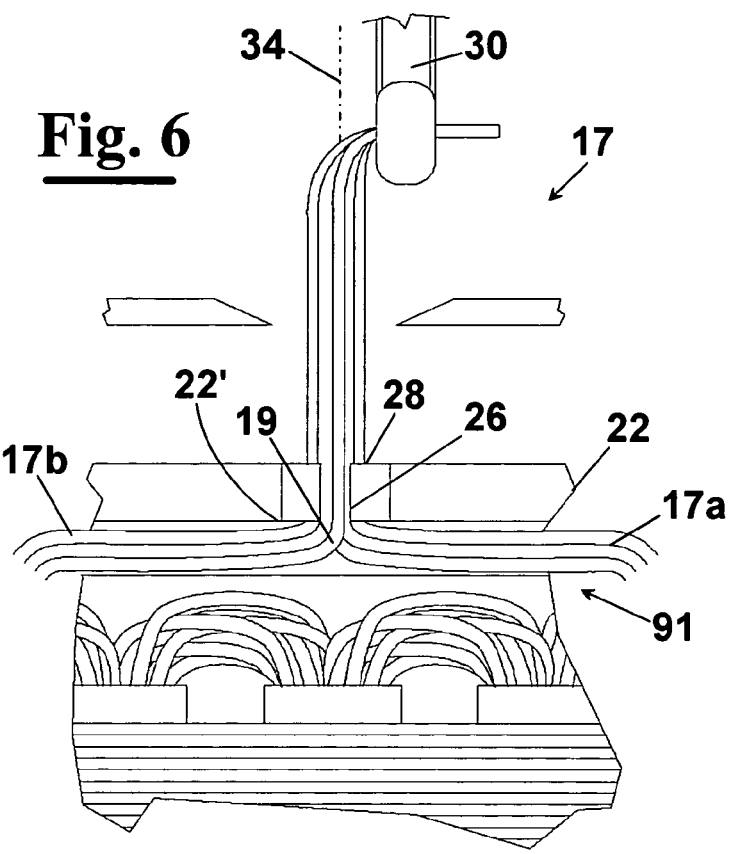
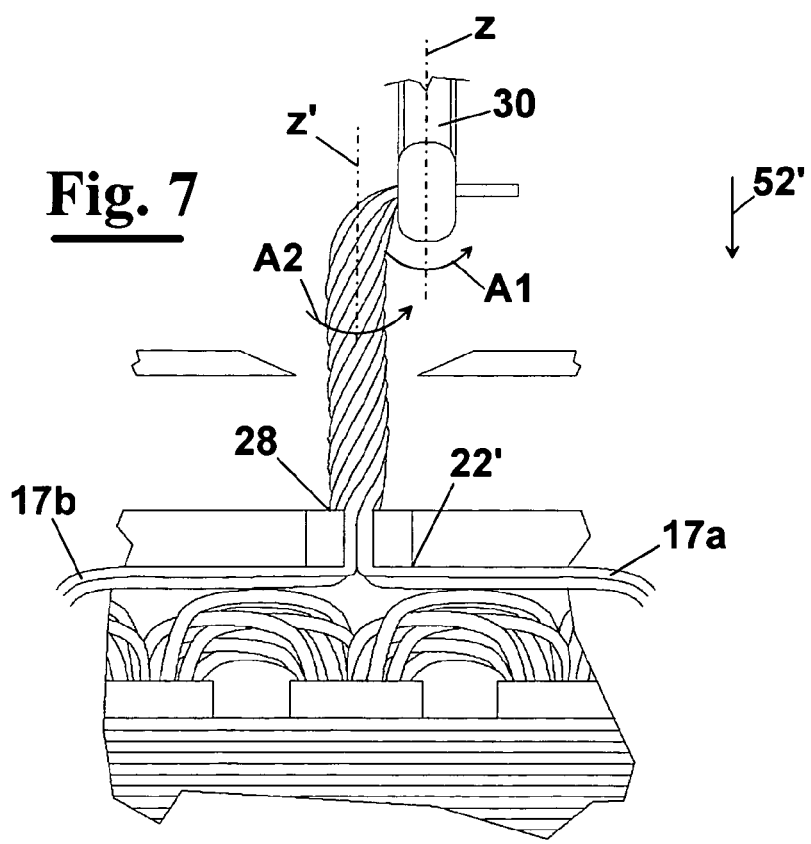

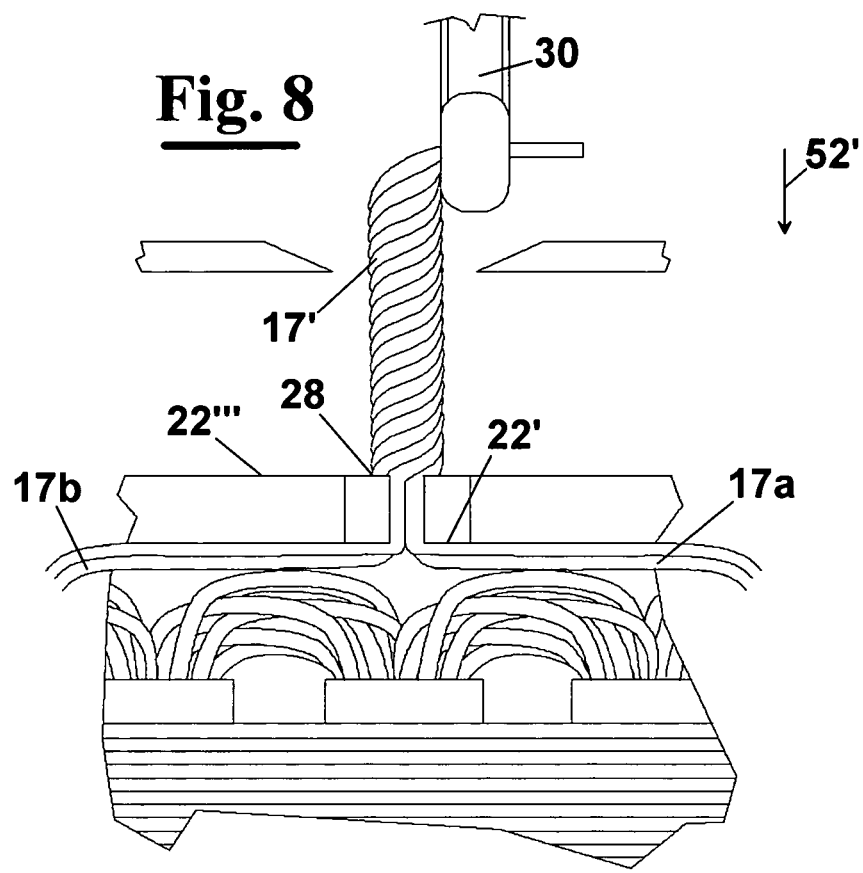
Fig. 8
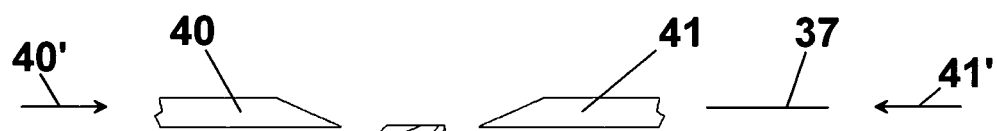
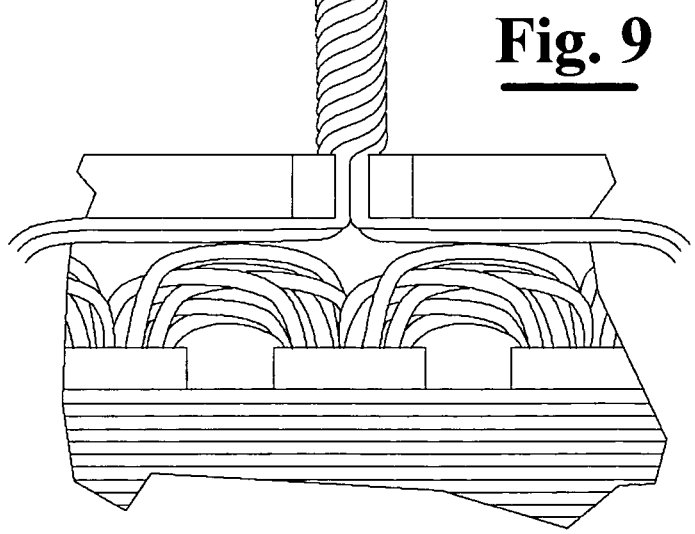
Fig. 9

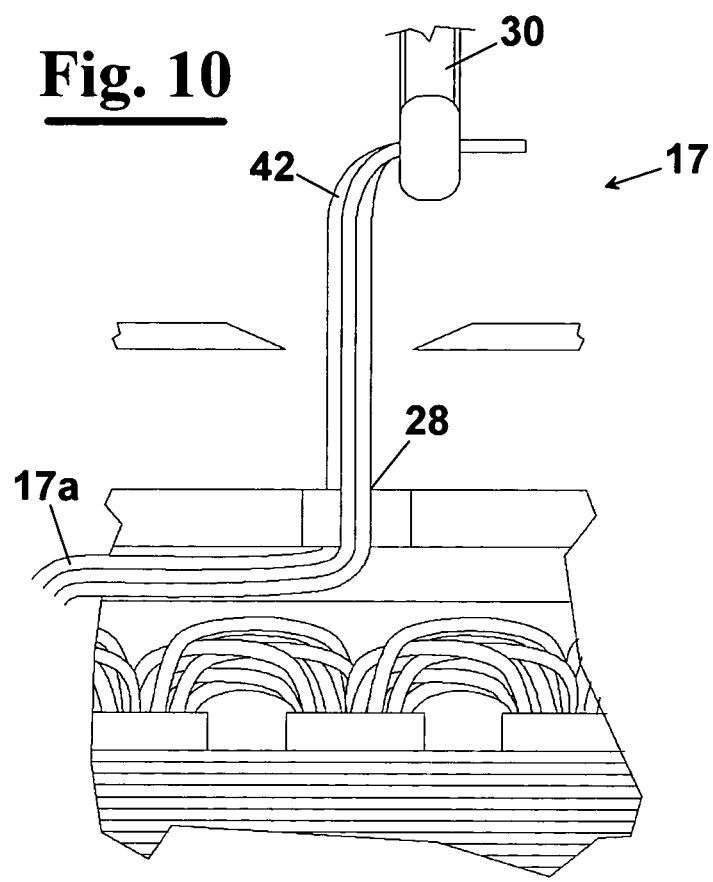
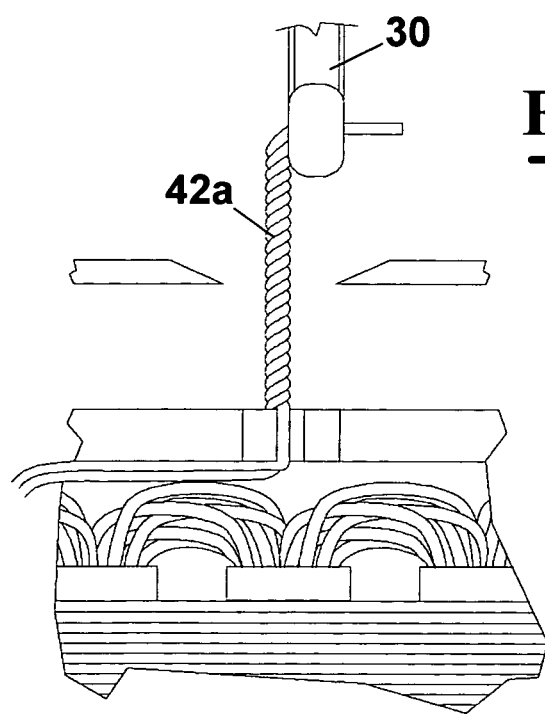

APPARATUS FOR TERMINATING LEADS OF PLURAL WIRES IN DYNAMO ELECTRIC MACHINE CORE

BACKGROUND OF THE INVENTION

The present invention relates to methods and apparatus for terminating leads of wire coils wound on magnetic cores of dynamo-electric machine components, such as stators for electric motors or generators.

DESCRIPTION OF THE PRIOR ART

The wire coils may be formed by simultaneously winding plural wires using a nozzle winder having one or more wire dispensing needles that deliver the plural wires directly into the slots of the magnetic core.

Alternatively, the wire coils can be first wound on a winding form by using a rotating flyer, or by rotating the winding form in order to draw onto the latter the plural wire. The finished wire coils are later stripped from the winding form and placed onto a tool, which is used for transfer to an insertion unit where a pushing operation inserts the wire coils and insulation covering into the slots of the magnetic core.

Generally, the wire coils are formed from a predetermined number of wire turns, where each wire turn consists of coil branches formed from a certain number of wires. The exemplary winders according to these principles are described, for example, in EP 1,076,401 and U.S. Pat. No. 6,557,238

U.S. Pat. No. 6,141,864 proposes a winding tool that is applied to a stator and which has slots for temporarily receiving leads to place them together and cut them. The cut leads are later removed from the slots and connected together by twisting. The winding tool optimizes manual operations of preparing the leads together and cutting them.

With modern stators, the number of leads of a core requiring the routing and mentioned termination procedures is increasing. Furthermore, the size and number of the wires used to form the plural wires is also increasing. Consequently, production times for the termination processes are becoming importantly longer and the automatic operations of the processes are becoming considerably more complex and difficult to achieve.

In view of the foregoing, it is an object of this invention to provide methods and apparatus for automatically placing the lead wires in relation to the core and twisting certain portions of the same lead wires to form a required section size of plural wires. It is another object of this invention to provide the above mentioned apparatus that can be readily adjusted to account for required variations in the placement of the leads.

A further problem is that the finished magnetic cores need to be extremely compact without requiring additional components for supporting the leads that have been routed proximal to the end faces of the core. To achieve this, the leads are routed directly in contact with the coils, and from here can depart in predetermined directions to become twisted.

It is therefore another object of this invention to provide methods and apparatus for automatically placing the lead wires in relation to the core and twisting certain portions of the same lead wires to form a required section size without requiring the use of additional components that need to be permanently assembled on the finished core for supporting the leads.

SUMMARY OF THE INVENTION

The invention foresees using termination members temporarily applied to at least one end of the magnetic core, after having wound the wire coils with plural wires drawn simultaneously. Initially, the leads formed from the plural wires are drawn in predetermined positions around the core as a result of the winding procedures. Successively, a wire manipulator selectively grasps the leads formed from the plural wires and moves them along the end faces of the core. At certain locations, the manipulator draws the plural wires within respective seats of the termination members. When moving the plural wires with the manipulator, these can be drawn against predetermined surfaces of the termination members so that the plural wires become deformed to follow predetermined configurations that correspond to the paths where the leads need to be permanently positioned adjacent to the ends of the coils.

Along the paths the plural wires can be passed through respective seats of the termination members. In doing so, the plural wires can be made to change direction so that they finally extend in predetermined directions. The direction change occurs by bending the plural wires against reference surfaces existing adjacent the entrance of the seat. Consequently, the plural wires forming a typical lead will exit the seat and extend beyond it in a predetermined direction. A portion of the plural wires extending in the predetermined direction can be twisted together for a certain length by programmed movements of the manipulator. The programmed movements of the manipulator are such that the plural wires become twisted together and pulled against the reference surfaces that are adjacent to the entrances of the seats. Each seat maintains the plural wires in a predetermined position during the twisting operations. Consequently, the resulting twisted portion will be located in a predetermined position determined by the seat and extends in the predetermined direction for a required length A cutter can later cut the twisted portions at a predetermined length from the core in order to form accurate extremities for connection to terminals.

Twisting causes each wire to form a helix having turns that will be placed adjacent and in contact with turns of the helixes formed with the other wires. The helixes of the various wires should be similar, i.e. their diameter and pitch should be the same so that crossing of the wires is avoided.

The wire termination tool may also include surfaces for pressing the routed leads against the coils to thereby limit the overall size of the finished core.

Due to the high number of leads that can be present in the core, and also for the complexity of the paths where the leads need to be placed, routing and twisting of the various leads can occur in various stages, which are performed in sequence to finish the core. More specifically, in each stage a limited number of finished leads of the total number of leads can be routed and twisted by using specific wire termination members. Accordingly, multiple termination apparatuses, each having wire manipulators and specific wire termination members can process in succession a given core to finish it. At the same time the multiple apparatuses can be working in parallel for performing respective stages of the termination cycle on different cores in order to reduce the production time for a core, and thereby increase productivity.

For certain number of wires that need to be twisted, there can be a wire that does not become twisted, which is located centrally amongst the plural wires. This wire can have less contact with the terminal because it becomes completely buried by the other wires. It is preferable to avoid that such a wire remains centrally and without twisting. In this situation, a lower number of plural wires can be twisted together in order to avoid that one wire remains centrally and without twisting. The lower number of wires that are twisted together is such as to avoid that one wire remains centrally and without twisting. Successively, the twisted portions with the lower number of wires can be twisted together to achieve the final result of a final twisted portion that has all the required wires.

Restraining members are placed in the free space of the bridges of the coils to prevent the coil wires from moving towards the faces of the core when the manipulator pulls on portions of the leads during twisting.

More particularly, the restraining members act as bearing surfaces for coils in planes approximately parallel to the end faces of the core.

Consequently, the wires of a coil engage the bearing surfaces during twisting and prevent movement of the coil heads towards the faces of the core. In this way a damaging contact is avoided between the coil heads and the slot insulating lining that protrudes beyond the end faces of the core. The final result is that the coil heads are impeded from engaging and crushing, or tearing, the insulating lining of the slots.

The restraining members can simultaneously move on respective radiuses with respect to the core, from an outward position that allows clearance for loading and unloading of the core to an inward position where the restraining members carry out their function of support surfaces during twisting of the coil leads.

The restraining members and the members for moving the restraining members in the radial directions can constitute a support assembly, which is mounted on a table. The table can have the purpose of transferring and positioning of the cores at various working stations where routing and twisting of the leads need to be performed.

The core can be supported and referenced by the support assembly.

In turn, the support assembly can be referenced and supported by the table.

The table can require various support positions for the cores. Consequently, a support assembly having the restraining members for a core can be mounted in each of the support positions of the table.

The actuator for moving the restraining members in the radial directions can belong to an actuating unit that is external both to the support assembly and the table. The actuator can cause movement of the restraining members when the support assembly becomes aligned with the actuating unit, as a result of movement of the table for transferring the cores.

The restraining members may be used to support only the wires of the coils heads that are adjacent to one face of the core. In this case, just the portions of one series of restraining members are positioned in the free spacing of the coils heads adjacent to that face of the core.

When the support function is required for the coil heads adjacent to both faces of the core, two series of restraining members are foreseen. More particularly, during twisting one series of restraining members support the coils heads adjacent to one face of the core and a second series of restraining members support the coil heads adjacent to the other face of the core The support assembly can be easily adapted for supporting cores of different height. The different height of a core requires aligning the restraining members with the different positions occupied by the free spacing existing between the coil heads.

The support assembly can easily be assembled on the table so that substitution of a support assembly can occur rapidly.

Therefore according to another aspect of the invention an apparatus for twisting plural wires comprises restraining members with portions positioned in spacing of the bridges of the coils to resist movement of the coils towards a face of the core during twisting of the plural wires; means for guiding the restraining members in the radial direction of the core to position the portions of the restraining members in the spacing of the bridges adjacent to an end face of the core;

means for moving the restraining members in the radial direction. According to another aspect of the invention, the apparatus comprises means for rotating the means for moving the restraining members in order to collectively move the restraining members in the radial direction with a synchronized motion and means for supporting the means for moving and the means for rotating.

BRIEF DESCRIPTION OF THE DRAWINGS

Further characteristics and advantages of the method and apparatus according to the invention will be more apparent from the following detailed description and the accompanying drawings of the preferred embodiments, which is made to be exemplary without being limitative.

In FIG. 2 the termination members have been shown transparent for sake of clarity. FIG. 2 also illustrates portions of leads formed from plural wires routed and twisted in accordance with the principles of the invention, although in FIG. 2 the stator has been omitted for sake of clarity In FIG. 3 the termination members have been shown transparent for reasons of clarity. FIG. 3 also shows that the termination members can be assembled on the stator of FIG. 1, which is shown with dashed line representation. Furthermore, FIG. 3 shows a manipulator in the process of routing a lead formed from plural wires FIG. 4 is a partial section view as seen from directions 4-4 of FIG. 3 illustrating the termination members applied to the stator shown in FIGS. 1 and 3. For reasons of clarity, FIG. 4 shows the leads of FIGS. 2 and 3 in their condition prior to twisting and without the manipulator shown in FIG. 3.

FIG. 4a is a partial section view as seen from directions 4a-4a of FIG. 4.

FIG. 4b is a partial section view as seen from directions 4b-4b of FIG. 4

FIGS. 6-9 are partial views from direction 6 of FIG. 4, with certain parts omitted for sake of clarity, illustrating various stages of routing and forming a twisted portion of a lead in accordance with the principles of the invention.

FIG. 10-13 are views similar to FIGS. 5 and 6 illustrating different stages of routing and forming a twisted portion of a lead in accordance with the principles of the invention.

In FIG. 15 the core has been omitted for reasons of clarity and the support assembly is assembled on a table, like the table of FIG. 14 adopted for transferring and positioning of the core at various stations where twisting of the coil leads occurs.

DETAILED DESCRIPTION OF THE PREFERRED EMBODIMENTS

Figure 1:
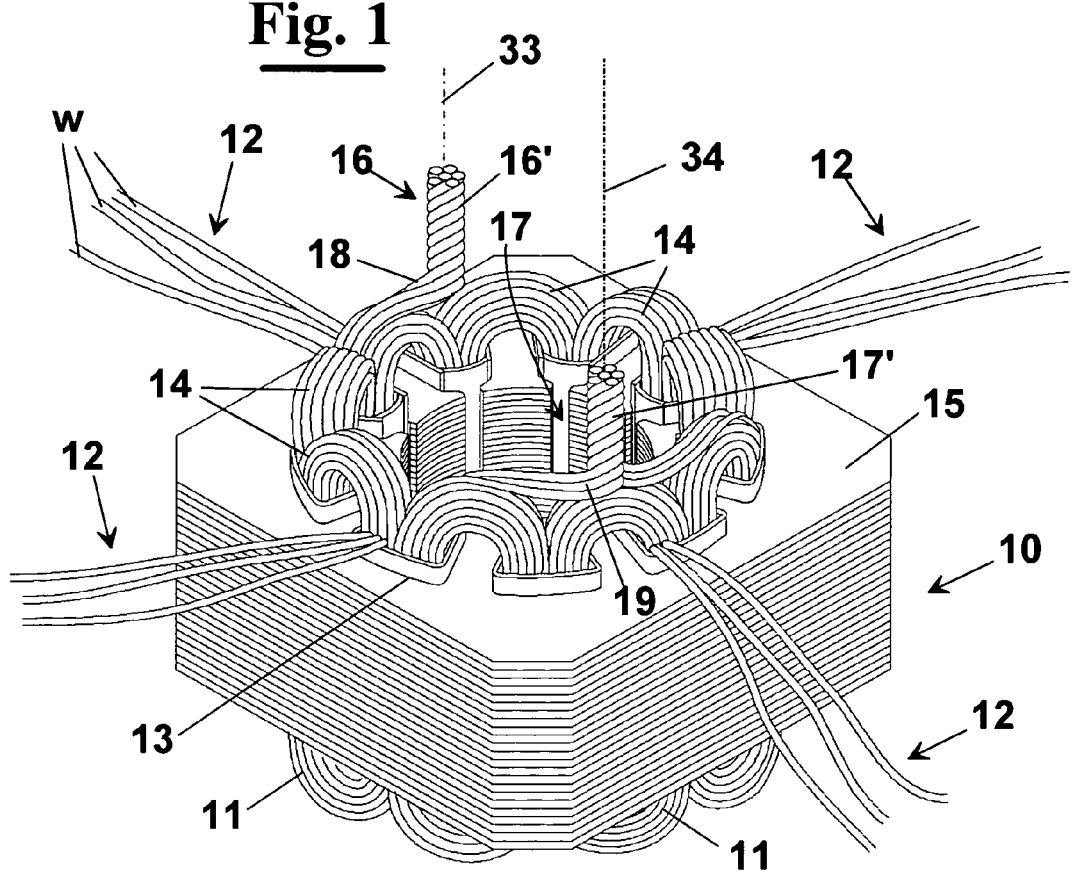
FIG. 1 is a perspective view of an illustrative embodiment of a stator at an intermediate stage of being manufactured in accordance with the principles of the invention
Figure 2:
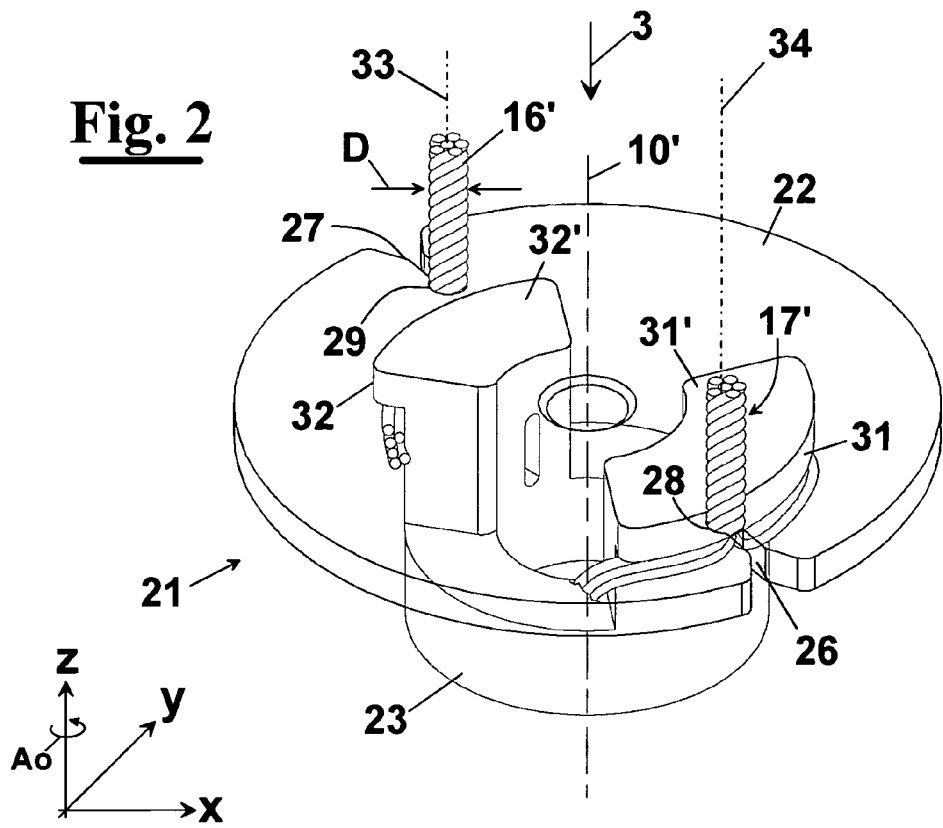
FIG. 2 is a perspective view of an embodiment of termination members which can be used for manufacturing the stator shown in FIG. 1.
Figure 3:
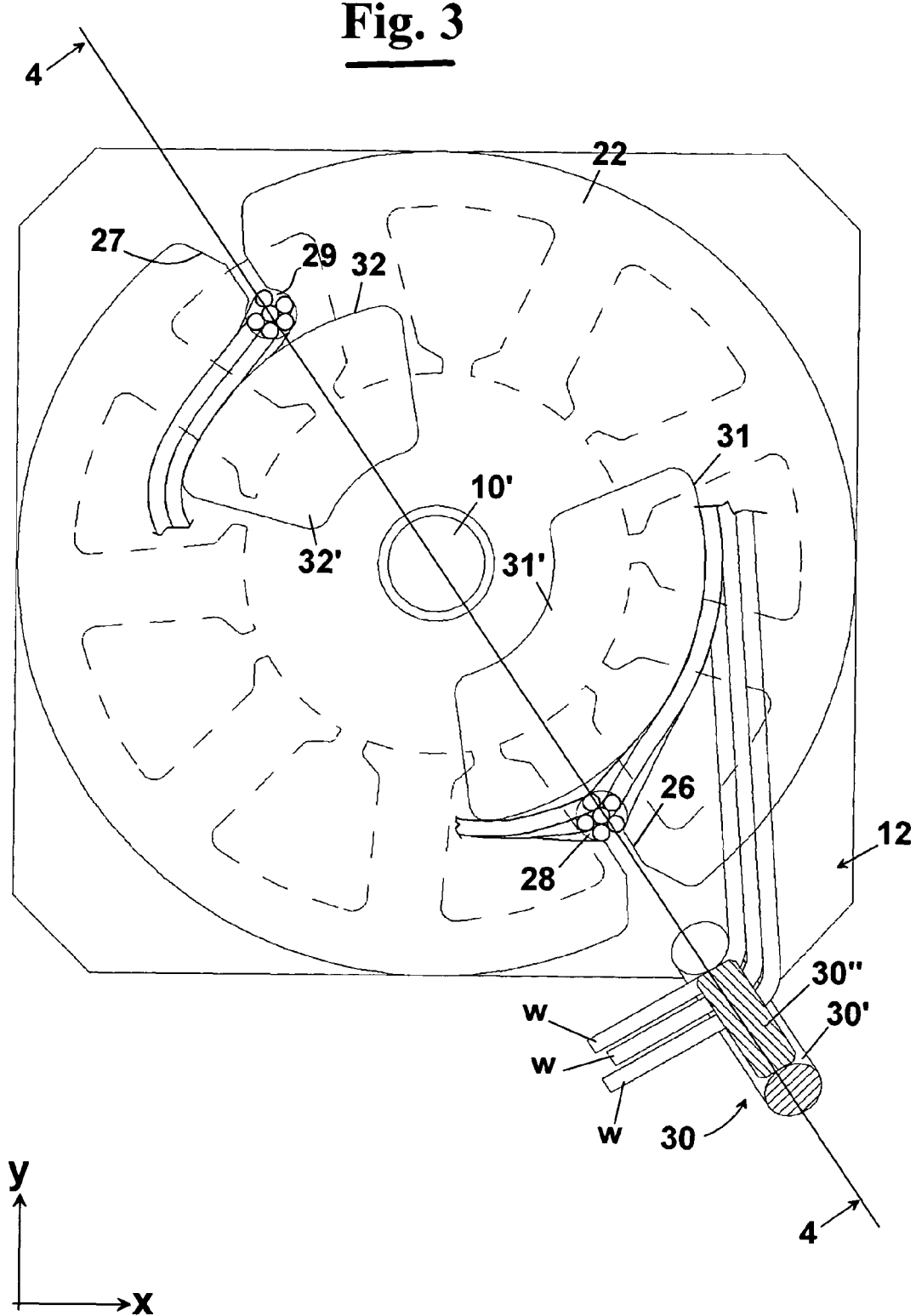
FIG. 3 is a view from direction 3 of FIG. 2.

FIGS. 1, 3 and 4 illustrate stator 10 wound with coils 11 and leads 12 each consisting of plural wires W. The coils have been wound in slots 13. The ends 14 of the coils extend beyond faces 15 of the core. In FIG. 1 certain leads 12 have been drawn to predetermined radial positions around the stator core in preparation for routing along predetermined paths and termination into terminals in accordance with the principles of the invention. In FIGS. 1, 2 and 3 other leads 16 and 17 are already routed, twisted and cut in accordance with the principles of the invention More particularly, twisted portion 16' of lead 16 is upstanding in direction 33 with respect to the ends 14 of the coils due to bending at position 18. Furthermore, twisted portion 16' has been cut at a predetermined distance with respect to end face 15. (see also FIGS. 2 and 3)

Similarly, twisted portion 17' of lead 17 is upstanding in direction 34 with respect to the ends 14 of the coils due to bending at position 19. Also twisted portion 17' has been cut to a predetermined distance with respect to end face 15 (see also FIGS. 2 and 3).

The diameter D of twisted portions 16' and 17' (see FIG. 2) needs to be within prescribed tolerances for correct joining to terminals.

FIG. 2 illustrates termination tool 21 consisting of two members 22 and 23 without the presence of stator 10. FIGS. 3 and 4 illustrate members 22 and 23 assembled on the stator, as is required for routing leads 16 and 17 and for forming twisted portions 16' and 17'.

More particularly, and with reference to FIG. 4, members 22 and 23 have been mounted coaxial to the axis 10' of stator 10. This can be accomplished by having abutment and centering of cylindrical shoulder 24 of member 23 with face 15 and the hollow walls of the stator.

Member 22 is sleeved into the cylindrical cavity 25 of member 23. In addition, member 22 is referenced angularly around axis 10' with respect to member 23 by a key engagement (not shown) existing between member 22 and member 23. Similarly, member 23 is referenced angularly around axis 10' with respect to stator by a key engagement (not shown) existing between member 23 and stator 10. As a result, member 22 will be referenced angularly around axis 10' with respect to stator 10. This chain of referencing achieves that the leads coming from the stator slots will result referenced with respect to routing surfaces of members 22 and 23.

When requiring to route and twist the leads, members 22 and 23 can be locked to stator 10 by means of assembly 50 (see FIGS. 4, 4a, 4b and 4c). The same assembly will lock stator 10 to an appropriate seat of a station as will become more apparent in the following.

Member 22 can be locked to the stator by means of shaft 51, which has enlarged end 51' that presses on shelf 58 of member 22 when shaft 51 is pulled in direction 52' (parallel to axis 10') by linear actuator 53.

Similarly, member 23 can be locked by means of tube 55, which has enlarged end 55' that presses on shelf 59 of member 23 when tube 55 is pulled in direction 52' by linear actuator 56.

Member 22 can move in direction 52 and 52' with respect to member 23 due to the sleeve assembly existing in cavity 25. Pin 70 which can abut against shelves 71 and 72 of member 23 limits the movement of member 22 with respect to member 23. In addition, pin 70 can act as a pressing connection between member 22 and 23. In fact, locking of members 22 and 23 to stator 10 can be accomplished by pressing with enlarged end 51' on shelf 58 and with enlarged end 55' on shelf 59, i.e. in direction 52'. As a result, pin 70 can press on shelf 71 whilst cylindrical shoulder 24 of member 23 presses on face 15 to lock members 23 to the stator. Consequently member 22 becomes locked to the stator through pressing of pin 70 on shelf 71.

Linear actuator 53 is connected to shaft 51 by means of coupling 54, which allows rotation around axis 10'. Similarly, linear actuator 56 is connected to tube 55 by means of coupling arm 57, which allows rotation around axis 10' due to bearing 57' assembled between tube 55 and coupling arm 57.

Shaft 51 can be rotated around axis 10' to orient enlarged head 51' with respect to passage 60 of member 22 in order to lock member 22. In the position of FIG. 4a, enlarged head 51' is pressing on shelf 58 and therefore is oriented at 90 degrees with respect to axis 60'. To pass enlarged head 51' through passage 60 in order to remove members 22 from the stator, shaft 51 needs to be rotated 90 degrees to align at zero degrees enlarged head 51' with axis 60'. In this way, the elliptical form of head 51' will be able to pass through the corresponding form of passage 60.

Similarly, enlarged head 55' of tube 55 has an elliptical form that needs to pass through a corresponding form of passage 61. Tube 55 can be rotated around axis 10' to orient enlarged head 55' with respect to passage 61 of member 23. In the position of FIG. 4b, enlarged head 55' is pressing on shelf 59 and therefore is oriented at 90 degrees with respect axis 61'. To pass enlarged head 55' through passage 61 in order to remove members 23 from the stator, tube 55 needs to be rotated 90 degrees to align at zero degrees enlarged head 55' with axis 61'.

Rotation of shaft 51 around axis 10' to orient enlarged head 51' can be accomplished using assembly 62, which consists of linear actuator 63 that is able to translate forward and backwards rack 64. Rack 64 meshes with gear 65 assembled on shaft 51 and is capable of transmitting rotation through key 66. Key 66 is assembled on shaft 51 and is capable of running in a way of gear 65 when shaft 51 is moved in direction 52 and 52'.

Similarly, rotation of tube 55 around axis 10' to orient enlarged head 55' can be accomplished using assembly 67, which consists of linear actuator 68 that is able to translate forward and backwards rack 69. Rack 69 meshes with gear 69' assembled on tube 55 and is capable of transmitting rotation through key 69''. Key 69'' is assembled on shaft tube 55 and is capable of running in a way of gear 69' when tube 55 is moved in direction 52 and 52'.

Therefore, enlarged heads 51' and 55' can be rotated between a position which locks members 22 and 23 and a position which releases members 22 and 23.

When members 22 and 23 are released they can be removed from stator 10 by inserting gripper head 73 in bore 74 of member 22. Gripper head 73 has expandable keys 73' which can grip the inside surface of bore 74. Gripper head 73 also has abutment ring 73'' which can engage the upper surface of member 22 to guarantee precise referencing between gripper 73 and member 22. Member 22 is part of a transfer device 105 shown in FIG. 14. Gripper 73 moves in direction 52 to remove members 22 and 23. Abutment of pin 72 against shelf 72 will guarantee that member 22 carries with it member 23 when gripper 73 moves in direction 52 (parallel to axis 10') to remove members 22 and 23.

Figure 4C:
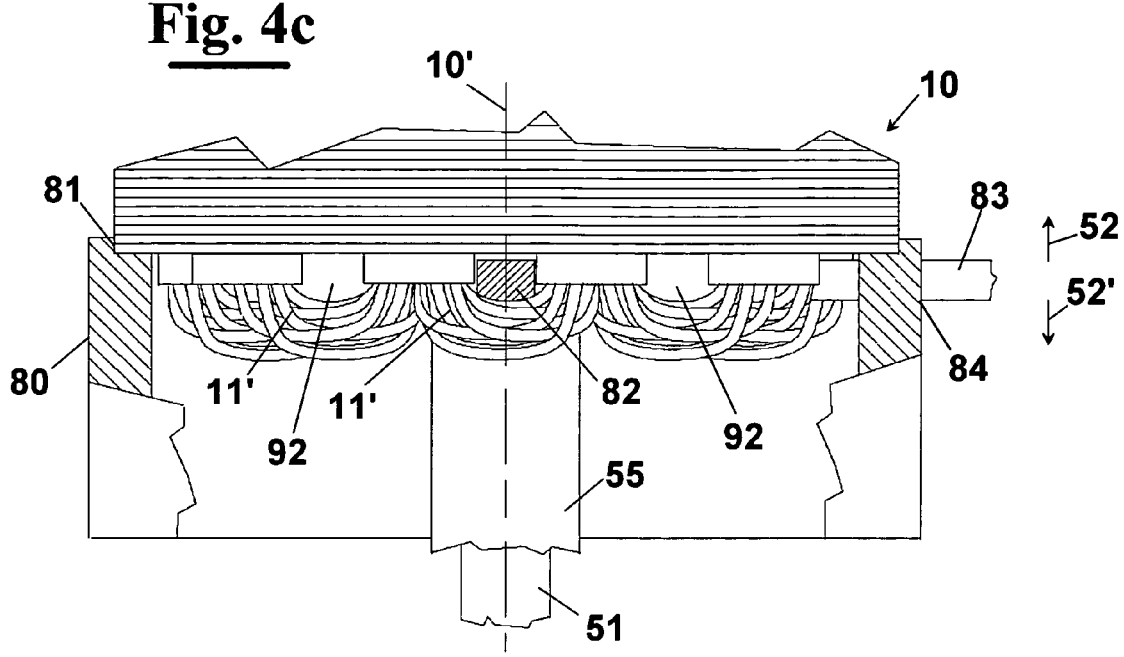
FIG. 4c is a partial section as seen from a direction like 4c of FIG. 4 illustrating parts which have been omitted in FIG. 4, due to the interruption made in FIG. 4 for reasons of clarity

FIG. 4c shows holder 80 which has groove 81 for seating stator 10 in alignment with axis 10'. Stator 10 can be kept pressed on the bottom of groove 81 by the pressure exerted with abutment surface 24 of member 23 on face 15. Holder 80 can be assembled on a transfer table like is described with reference to FIG. 14. Holder 80 becomes aligned with shaft 51 and tube 55 by movement of the transfer table FIG. 4c shows that members like 82 and 83 can be inserted in the free space created between the bridges 92 of predetermined coils. Members 82 and 83 can be supported in slots like 84 of holder 80 to achieve radial motion (by means of an actuator—not shown) in order to become positioned as shown in FIG. 4c. Furthermore, the support in the slots is needed to make members 82 and 83 react when acting as support arms to resist that the coils become pulled in direction 52 during the operations to twist leads 16 and 17. In this way any tendency of the coils to move in direction 52 during the operations to twist the leads is avoided. The stator can be placed on holder 80 by being moved in direction 52' while it centered with respect to the center of holder 80. In this way the stator becomes aligned also with shaft 51 and tube 55, which need to lock members 22 and 23.

FIGS. 2, 3 and 4 show the result of having grasped leads 16 and 17 with manipulator 30 in the condition of the leads 12 being like is shown in FIG. 1 and having routed them as plural wires through slots 26 and 27 and into seats 28 and 29 of member 22.

Member 22 can be moved in direction 52 to position it more distant from stator 15 in order to create spacing 91 (see FIG. 6) for routing the wires around the stator. This can be accomplished by actuating actuator 53 which moves enlarged head 51' against elastic ring 90 to translate member 22 in direction 52

Slots 26 and 27 are radial passages for the wire and present access from the periphery of member 22. Slots 26 and 27 communicate with seats 28 and 29, respectively. Seats 28 and 29 can have the configuration of bores, where each bore is able to receive at least the total section of the number of wires which need to form the twisted portion of a lead.

To grasp the leads and route them as has been shown in FIGS. 2, 3 and 4, manipulator 30 can move in directions X, Y and Z and accomplish rotations AO (see FIGS. 2 and 3) around axis Z. The mechanisms 111 (see FIG. 14) for accomplishing these movements can be similar to the equipment that has been described in EP 469.426.

Manipulator 30 can draw the leads against surfaces 31 and 32 of member 23 to route the plural wires along predetermined paths in order to reach locations 18 and 19 where the bends occur. When the manipulator draws the wires W along these paths, the wires can run through the gripper section 30' of the manipulator. The manipulator initially grips the wires W in the condition of leads 12 in FIG. 1. The grip can be at a point along the wires that will allow the wires to run through the gripping section 30' during routing.

Preferably wires W can be held by gripping section 30' so that they do not cross a s shown in FIG. 3. This result can be achieved by providing gripping section 30' with respective seats for seating each of the wires W. The seats can be grooves (hidden in FIG. 3 by the presence of wire pressing members 30").

Due to the fact that wires W are seated in their respective seats of the gripping section 30' during the movements of the manipulator 30, wires W do not cross each other when routed along the trajectories and wound in the helixes of the twisted portions.

Surfaces 31 and 32 can be cylindrical sides respectively of portions 31' and 32' of member 23 (see FIGS. 2 and 3), and can be located over coil ends 14 (see also FIG. 4). As a result, the leads reach slots like 26 and 27 by being routed along predetermined paths which follow the contour of surfaces 31 and 32. Portions 31' and 32' can be received in recesses of member 22 as shown for example in FIGS. 2 and 4.

Figure 5:
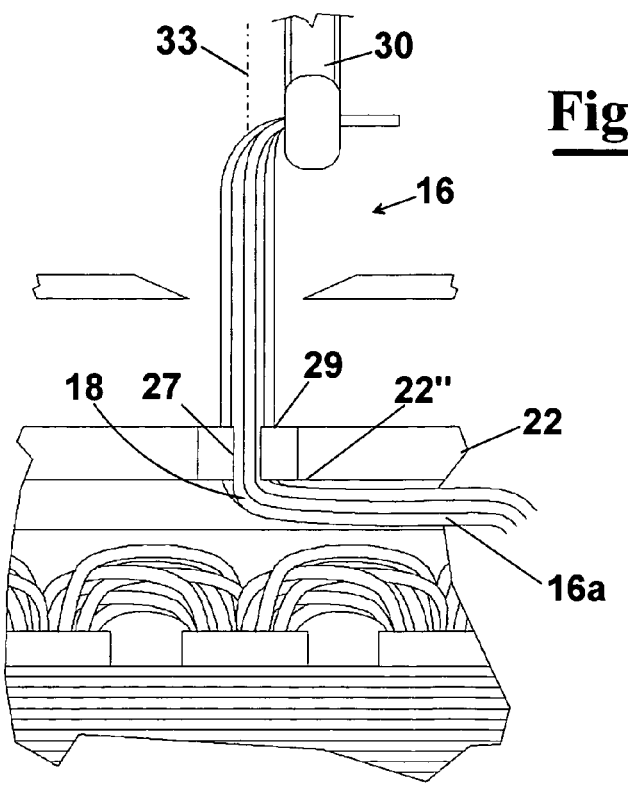
FIG. 5 is a partial view from direction 5 of FIG. 4 illustrating stages of routing a lead in accordance with the principles of the invention.

At slots like 26 and 27, the manipulator draws the leads through the radial passage portions in order to locate the end portions of the leads within seats 28 and 29—see for example FIGS. 4 to 6.

As illustrated in FIGS. 5 and 6, the manipulator can first move to draw the plural wires against surfaces 31 and 32 and then into slots like 26 and 27 to reach the required position in seats 28 and 29 and alignment in predetermined directions 33 and 34.

A lead like 17 shown in FIG. 6 that is coming from two separate slots of the stator can be brought into slot 26 and seat 28 in two stages; i.e. in a first stage, lead portion 17a can be brought into slot 26 and seat 28 by manipulator 30. Successively, in a second stage, lead portion 17b can be brought into slot 26 and seat 28 by manipulator 30. Lead 17 is thus formed of two portions 17a and 17b. Both portions form bends at 19 and pass in seat 28 to become directed in direction 34. The bends can be formed by bending the plural wire against surface 22', which is located in the area adjacent to seat 28 and faces the stator A lead like 16 shown in FIG. 5, which is coming from a single slot of the stator, can be brought into slot 27 and seat 29 in one stage of grasping and movement on behalf of manipulator 30. Lead 16 forms a bend at 18 and passes in seat 29 to become directed in direction 33. The bend can be formed by bending the plural wires against surface 22',' which is located in the area adjacent to seat 29 and faces the stator.

To start forming the twisted portions, the plural wires of leads like 16 and 17 need to be held contemporarily by the manipulator respectively in predetermined directions 33 or 34, with the plural wires constrained in the positions of seats 28 and 29, see FIGS. 5 and 6. A pressing member like 93 (see FIG. 4) can press on the plural wires in their extents just outside seats 28 and 29 to assure increased constraint of the plural wires in seat 28 and 29. In FIG. 4, member 93 is pressing on the wires in a radial direction 93' towards axis 10' of the stator.

Then to twist the leads (see FIGS. 7 and 8), manipulator 30 in the condition of holding the plural wires as shown in FIGS. 5 and 6, rotates around its axis Z (rotation A1 or AO) and at the same time rotates around axis Z' (rotation A2), which is where the leads are positioned to be in directions 33 or 34. To complete a turn of the various helixes one rotation around axis Z and a simultaneous rotation around axis Z' is needed.

In addition, manipulator 30 needs to move in direction 52' to avoid excessive strain on the wires as twisting progresses. This movement of manipulator 30 can be with a law of motion that maintains tension on the wires by pulling them against surface 22'. During this pull, wires W are prevented from moving towards the manipulator in direction 52 due to their engagement against surface 22'. As a result, during these movements for twisting, the twisted portions will result in a precise location above the heads of the coils, due to the position constraint given by seats 28 and 29, and aligned in directions 33 and 34 due to the pull of manipulator 30.

Prior to starting rotation of the manipulator for twisting, termination member 22 can be moved in direction 52', i.e. towards the core (see FIGS. 7 and 8 showing member 22 nearer to the core). Contemporarily, manipulator 30 which is holding all the wires of the lead is moved in direction 52' so that the wires do not become over strained due to the movement of member 22 in direction 52'. The movement in direction 52' of member 22 will bring surface 22' nearer to the coil heads 14 (see the conditions of FIGS. 7 and 8), which will later impede portions 16*a*, 17*a* and 17*b* from moving in opposite direction 52 during rotations of the manipulator to twist the leads. In addition, movement in direction 52' of member 22 compacts portions of leads like 17*a*, 17*b* and 16*a* against the heads of the coils 14.

Correct twisting transforms the wires into a number of adjacent helixes, where each helix is formed from a wire (see FIGS. 7 and 8). The turns of a helix correspond to the number of rotations accomplished by manipulator 30. In addition the various helixes should be formed adjacent to each other without crossing, i.e. with turns of the same diameter D and with constant pitch, as shown in FIGS. 7 and 8. Imperfect forming of the helixes would cause disorderly winding of the helixes on each other, thereby creating abnormal bulges and voids along the length of the twisted portions.

Rotations of the manipulator can be stopped when a predetermined number of turns of the helixes have been formed. This can guarantee that a predetermined length of twisted portion exists from member 22 to cutting level 37. At level 37, cutters 40 and 41 can approach each other in directions 40' and 41', respectively, to cut the twisted portions, as shown in FIG. 9.

If requiring to twist further portions of the leads remaining in seat 28 and 29, then prior to cutting the twisted portions, termination member 22 can be moved further in direction 52' to cause the required lead portions to move in direction 52 in order to exit seats 28 and 29. Then rotation of the manipulator can be resumed to continue twisting the wires up to the upper surface 22''' of member 22.

When a high number of wires need to be twisted together, it can occur that at least one wire remains untwisted at the center of the section of the twisted wires. To manage to twist even this wire, the wires can be twisted together in lower numbers, and successively the resulting twisted portions can be twisted together to form a single twisted portion—see FIGS. 10-13 concerning operations for twisting a lead having portions like 17*a* and 17*b* described in the foregoing.

As shown in FIGS. 10 and 11, a certain number of wires 42 of branch 17*a* are brought into seat 28 and twisted together to form a first twisted portion 42*a*. Successively, a further number of wires 42' of branch 17*b* are brought into seat 28 and twisted together to form a second twisted portion 42'*a* (see FIG. 12).

Figure 12:
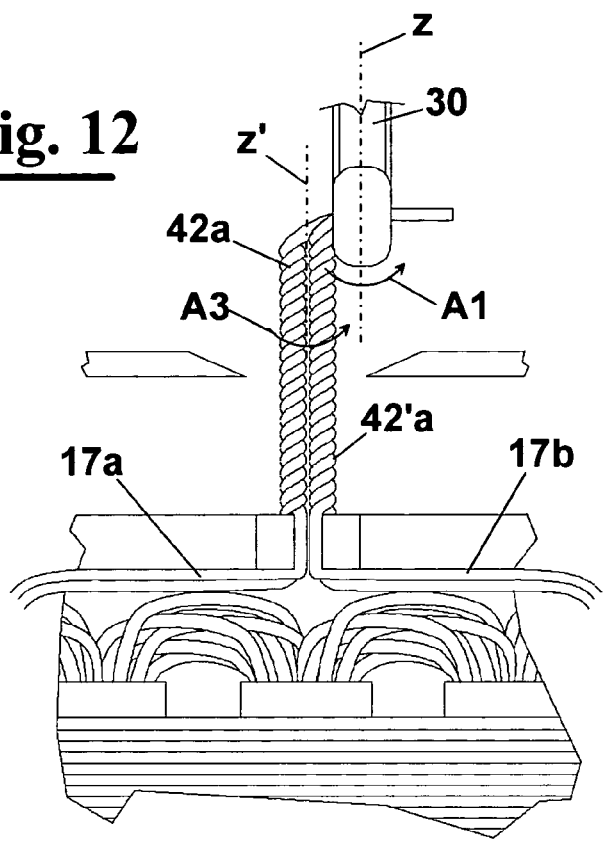
Figure 13:
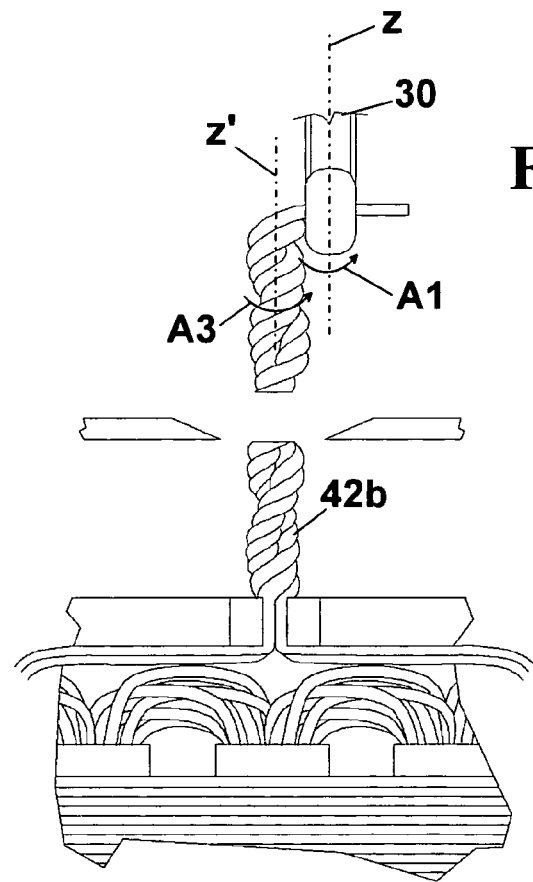

Then, as shown in FIGS. 12 and 13 the two twisted portions can be grasped by manipulator 30 and a resulting twisted portions 42*b* can be formed by rotations A1 and A3. In this case rotation A3 can be around axis Z' located between the two twisted portions, as shown in FIGS. 12 and 13.

Figure 14:
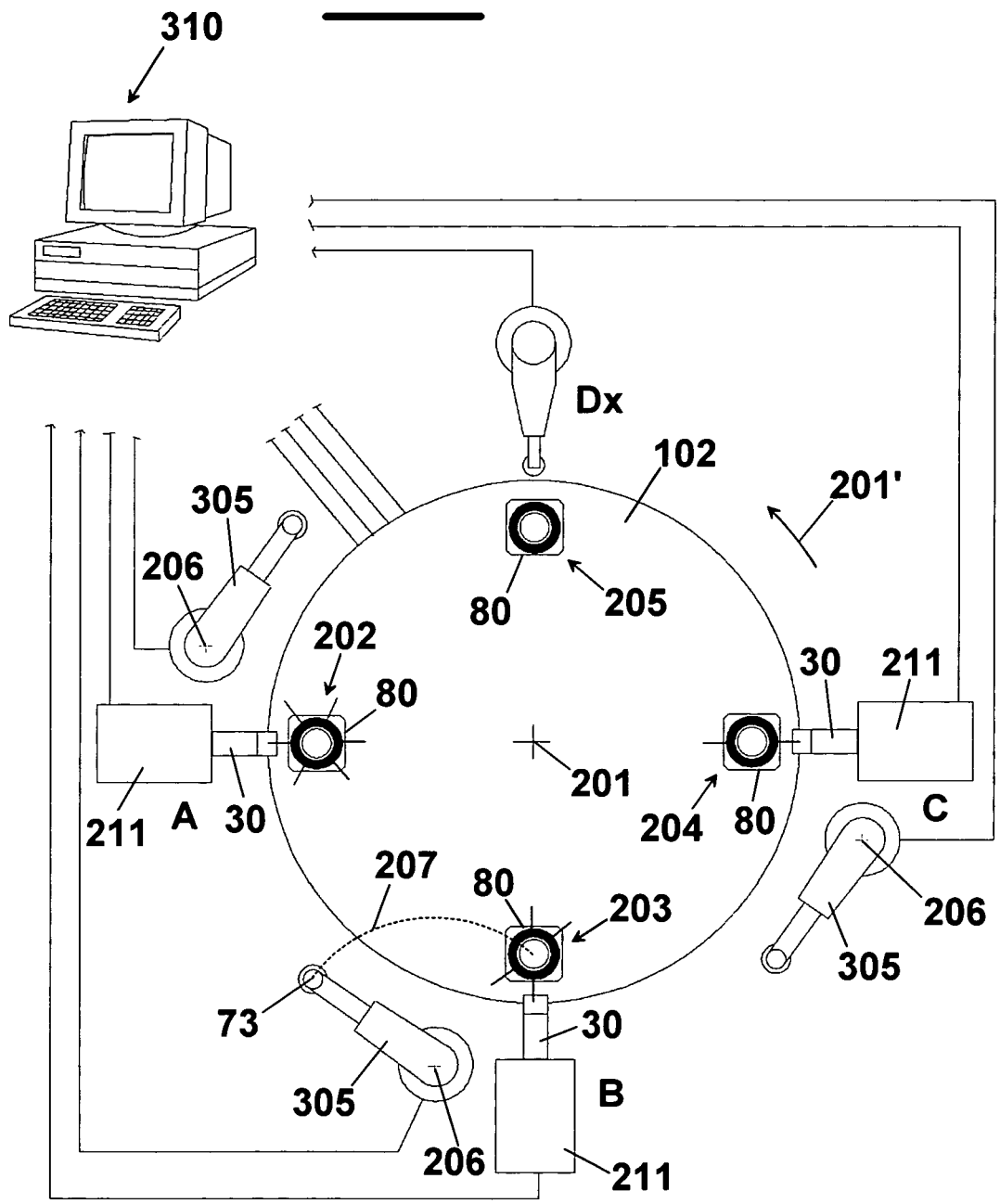
FIG. 14 is a view similar to FIG. 3 showing a manufacturing environment with multiple stations for terminating the core.

FIG. 14 shows a layout of a rotating table transfer machine in which the principles of the invention can be applied. Transfer table 102 is capable of rotating around center 201 in directions 201'. Holders like 80 are fixed on the transfer table at positions like 202, 203, 204, 205, which are equidistant from each other for seating stators 10. Table 102 stops rotation around center 201 to align the holders with manipulators like 30 present in each of stations A, B and C. Also present at each station of stations A, B and C is an assembly like 50 for locking/unlocking members 22 and 23 as has been described in the foregoing with reference to FIG. 4. Furthermore at each of stations A, B and C a transfer arm 305 is capable of rotating around axis like 206. Each transfer arm 305 is provided with a gripper like 73 for applying and removing members 22 and 23 from the stator positioned in the station where the arm is located. Dashed lines 207 show a typical trajectory that a gripper like 73 can accomplish to align members 22 and 23 with the stators, prior to moving in direction 52' to actually apply members 22 and 23 to the stator. In each of stations A, B and C, a certain number of the total leads of a stator can be terminated according to the cycle principles that have been described in the foregoing for leads 16 and 17. Therefore, in each of stations A. B and C a specific cycle of the three in sequence required to finish stator 10 will be accomplished. The sequence will start in station A and be finished in station C. Station DX can be a station for loading and unloading the stator between the table and a conveyor (not shown).

At stations like A, B and C, members like 22 and 23 will be dedicated for the cycle to be accomplished, i.e. configured for predetermined lead trajectories, and having seats like 28 and 29 and reference surfaces like 22' and 22'' positioned and configured specifically for the routing, bending and twisting that is required in the specific cycle of the stator. Station A. B and C can be operating at the same time so that a stator can be processed in a fraction of the time that would be required for an entirely sequential non parallel processing of the leads.

Control means 310 (see FIG. 14) can be programmed to move manipulators 30 according to the variable lead trajectories that characterize the stator which needs to be processed. The control means causes the manipulator to perform the movements and tensioning cycle required during the twisting processes mentioned in the foregoing The programs foresee sequencing movements of member 22 in order to compact the leads and function for twisting operations as has been mentioned.

The same control means can sequence operations of table 102 and transfer arms 305 to be synchronized with the operating cycle of manipulators 30.

Signal and supply lines will be available to connect the various actuators to control means 310 as shown in FIGS. 4 and 14.

Figure 15:
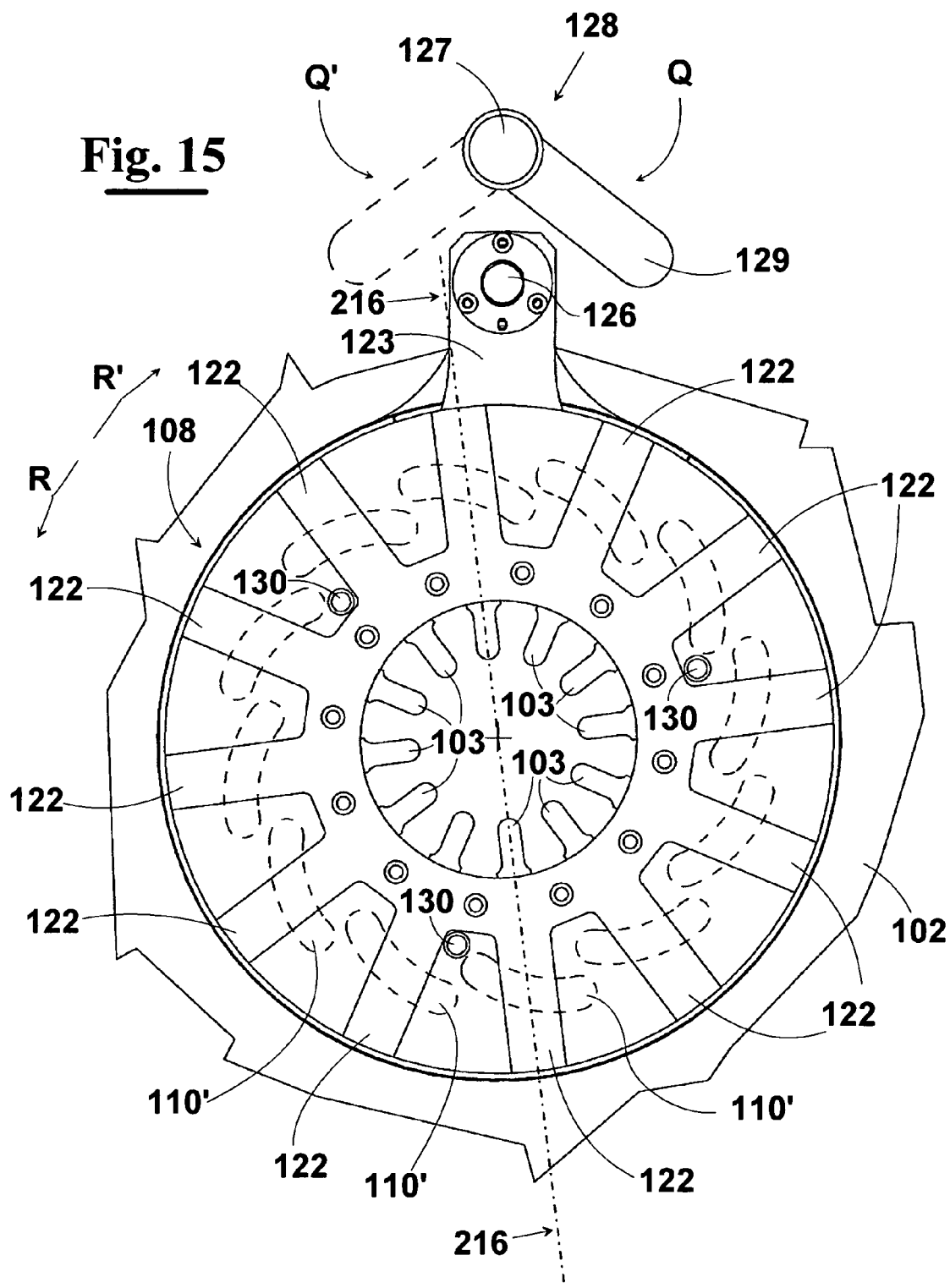
FIG. 15 is a plan view like the view of FIG. 14 illustrating a support assembly for the core with restraining members positioned in an inner radial position, like is the condition for supporting coil heads during twisting operations.
Figure 16:
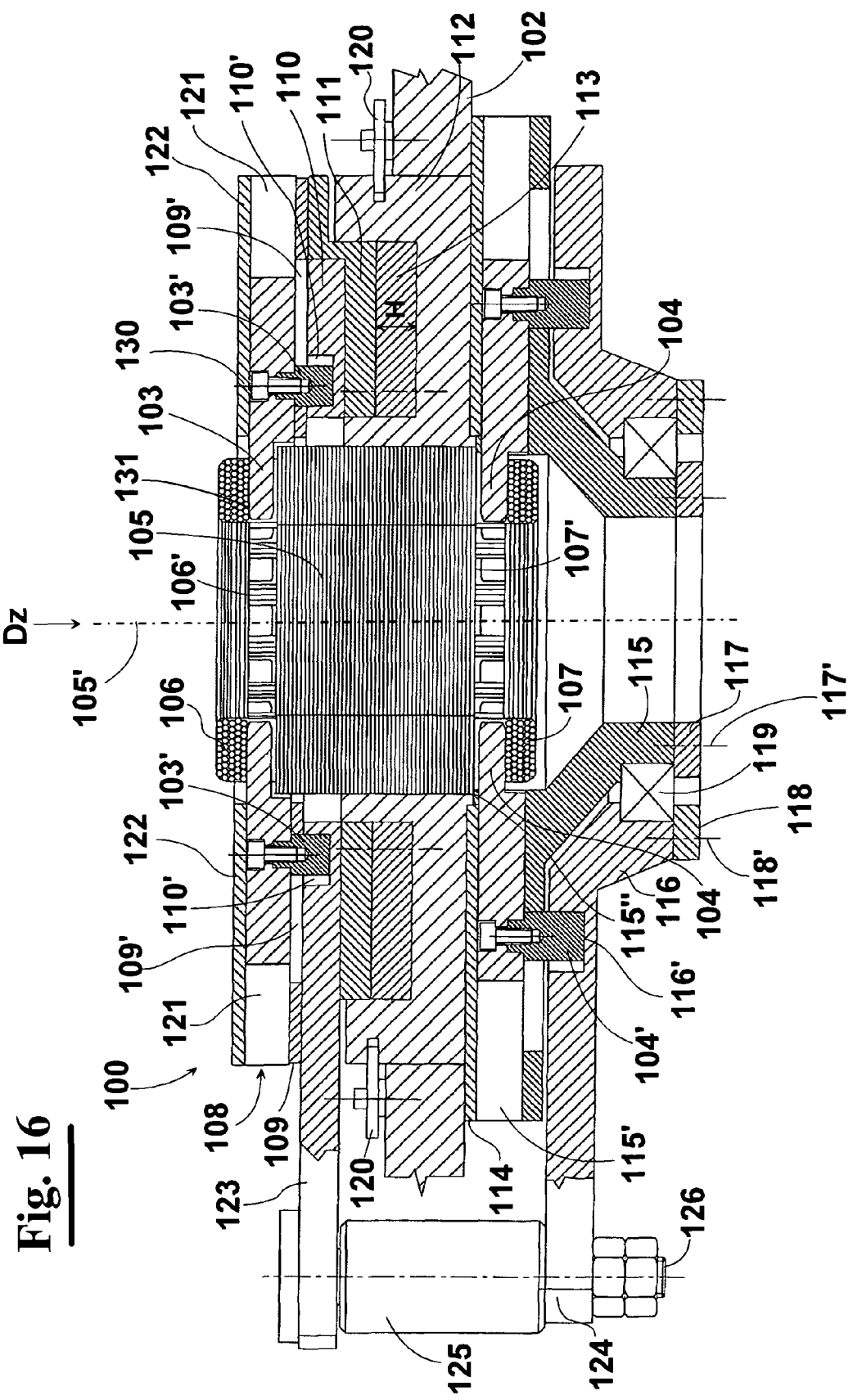
FIG. 16 is a section view as seen from directions 216-216 of FIG. 15 illustrating the support assembly of the invention for positioning the restraining members and supporting the cores.

With reference to FIG. 16 a wound core 105 is shown positioned in support assembly 100 of table 102 in preparation for routing and twisting of the leads. In FIG. 16, the leads have been omitted for reasons of clarity. Coil heads 106 and 107 are shown adjacent to respective end faces 106' and 107' of the cores. Restraining members like 82 and 83 mentioned above with reference to FIG. 4C are referenced either 103 or 104 in the embodiment of FIGS. 15 and 16

More particularly, in FIG. 16 portions of a first series of restraining members 103 are shown positioned in the free spacing 131 existing between coil heads 106 and the adjacent face 106' of the core 105. FIG. 16 also illustrates a second series of restraining members 104 shown in the free spacing existing between coil heads 107 and adjacent face 107'. The position of the restraining members illustrated in FIGS. 15 and 16 is the radial inner most position of the restraining members towards the central axis 105' of the core, and is required for supporting the portions of wires forming the coil heads during twisting. In this position the end portions of the restraining members prevent the portions of wires of the coils from moving towards the adjacent faces 106' and 107' of the core when the leads of a coil are pulled by the manipulator during the twisting operations.

The outermost radial position (not shown) of the restraining members is a retracted position that allows core 105 to be inserted and positioned in the support assembly, like is shown in FIG. 16, by moving the core in direction DZ. More particularly, with the movement in direction DZ, core 105 becomes positioned in the support assembly when face 107' bears against ridge 115" of member 115, as is shown in FIG. 16. The core can be oriented specifically around axis 105', which is also the axis of symmetry of the support assembly, by engaging a protuberance (not shown) of member 112 in a slit of core 105. An automatic gripping device (not shown) of a load/unload unit present in station DX of FIG. 14 can be used for positioning and orienting the core in the support assembly by translation and rotation of the core, respectively in direction DZ and around axis 105'.

Cover member 108 seats each restraining member 103 of the first series in a respective channel 121 placed along a radius that intersects axis 105' of the core (see also FIG. 15 where the cover portions 122 of the channels are shown). The sides of each channel 121 guides a restraining member 103 along a respective radius during the alternative radial movement between the coil head support position and the outermost radial position.

Bottom member 109 is a disk member attached to cover member 108. Bottom member 109 acts as a support surface for the sliding movement of restraining members 103 during the radial movement.

A cam follower pin 103' is assembled by means of a bolt on each of restraining members 103. The cam follower pin passes through a respective radial slot 109' of bottom member 109 and finds seating and engagement in respective slots 110' of driving member 110. More in detail, the engagement of the cam follower pin in slots 110' can occur against a side of slot 110'.

Driving member 110 is seated and centered in containing member 111 for rotating around central axis 105' of the core.

Containing member 111 is centered by support member 112. Containing member 111 bears on spacer member 113, which is supported inside support member 112. Support member 112 is supported and fixed on the surface of table 102 by means of fixing plates 120.

The height H of spacer member 113 determines the height of restraining members 103 from ridge 115" where the core to be processed is supported. By substituting spacer member 113 with a spacer member 113 of different height, different positions of restraining members 103 can be reached to compensate for differences in the height of the cores that need to be processed.

Slots 110' are present for each cam follower pin 103' and have an extension in a plane perpendicular to axis 105' (see FIG. 15 for the dashed line representation of the extension of the slots), which makes the side of slots 110' engaged by cam follower pin 103' produce a radial motion of a restraining member 103 when driving member 110 is rotated around axis 105' in direction R. Therefore, rotation in direction R around axis 105' will cause synchronized inward radial movement of all the restraining members 103, whilst rotation in opposite direction R' around axis 105' will cause synchronized outward radial movement of all the restraining members 103.

A first series of bolts (not shown) have their heads pressing against member 108 and are screwed into member 111. The stems of these bolts pass through openings of members 109 and 110. Accordingly member 108 is joined to member 111. Members 103 and drive member 110 are packed in between members 108 and 111 and are able to accomplish their respective movements due to an adequate play that is typically foreseen between stationary and moving parts.

A second series of bolts 130 (the heads of which are shown in FIG. 15, whilst one of the axes of their stems is shown in FIG. 16) have heads pressing against member 111 and are screwed into member 112. Accordingly, member 111 is joined to member 112. Therefore member 108 becomes joined to member 112 because member 108 is joined to member 111 by means of the first series of bolts.

This arrangement makes it possible to provide the support assembly 100 only with a first series of restraining members 103 for supporting the coils heads, i.e. without the second series of restraining members 104, if required.

When the second series of retraining members are foreseen, each restraining members 104 of the second series can be seated in a respective radial channel 115'" of member 115. The radial channel 115' guides the restraining member during the radial movement to reach the coil head support position shown in FIGS. 15 and 16.

Member 115 is fixed to support member 112 by bolts (not shown). Member 114 is interposed between member 115 and support member 112, and acts as a running surface for restraining members 104 when restraining members 104 move in the radial directions.

A cam follower pin 104', like 103', is assembled by means of a bolt on each of restraining members 104. The cam follower pin 104' passes through a respective radial slot of bottom member 115 and finds seating and engagement in respective slots 116' of second driving member 116. The engagement of a cam follower pin 104' in a respective slot 116' occurs against a side of slot 116'.

Driving member 116 is assembled on the outer ring of bearing 119. The inner ring of bearing is assembled in a seat of member 115. Cap 117 is fixed by bolts (shown with the dashed line 117') to member 115 in order to secure the inner ring of bearing 119 to member 115. Similarly, cap 118 is fixed by bolts (shown with the dashed line 118') to member 116 in order to secure the outer ring of bearing 119 to member 116.

Slots 116' have an extension in the plane perpendicular to axis 105' that is identical to the extension of slots 110' in their previously mentioned parallel plane. Therefore, cam follower pin 104' engages a side of slots 116' to produce a radial motion of a restraining member 104 when driving member 116 is rotated around axis 105' in direction R. Therefore, rotation in direction R around axis 105' will cause inward synchronized radial movement of all the restraining members 104, whilst rotation in opposite direction R' around axis 105' will cause outward synchronized radial movement of all the restraining members 104.

The assembly of bottom member 115 to support member 112 and the assembly of drive member 116 to bottom member 115 is an arrangement that allows the support assembly to be provided only with the second series of restraining members 104, i.e. without the first series of restraining members 103, if required.

Driving member 110 is provided with an arm portion 123 that extends outwardly from the support assembly through a slotted portions of member 111. Similarly, second driving member 116 is provided with arm portion 124 that extends outwardly from the support assembly. A cylindrical bush member 125 can be interposed between arm portion 123 and arm portion 124 by being assembled on the stem of bolt 126. Bolt 126 passes though bores of arm portions 123 and 124.

Arm 129 of an actuating unit 128 (see FIG. 15) can rotate around fulcrum 127 in either directions of rotation Q or Q' to engage and push on bush member 125. Accordingly, arm portion 123 and arm portion 124 will be rotated in direction R or R' respectively by rotation Q or Q' of arm 129 around fulcrum 127 to produce the required radial motions of restraining members 103 and 104.

It should be contemplated that arm portion 123 by itself can be rotated by an arm like 129 when only the first series of restraining members 103 are present in the support assembly. Similarly, arm portion 124 by itself can be rotated by an arm like 129 when only the second series of restraining members 104 are present in the support assembly.

Removal of support assembly 100 from the table and its substitution with another support assembly can occur by removing bolts 130 that fix member 111 to support member 112 and by releasing bolt 126. In this way member 108, the series of restraining members 103, member 109, driving member 110 and member 111 can be removed as a unit from table 102.

Furthermore, removal of plates 120 from engagement with the slots of support member 112 allows support member 112, member 114, member 115, the series of restraining members 104 and member 116 to be removed as a unit from the underside of the table 102, by movement of support member 112 in direction DZ.

The foregoing is merely illustrative of the principles of this invention and various modifications can be made by those skilled in the art without departing from the scope and spirit of the invention.

The invention claimed is:

1. Apparatus for terminating leads of coils of dynamo electric machine cores, each respective lead being formed from respective plural wires; the apparatus comprising:
means for simultaneously manipulating the plural wires of a respective one of the leads to dispose the plural wires of the respective one of the leads along a respective predetermined trajectory in relation to the core;
the manipulating means comprising means for holding the plural wires of the respective one of the leads;
means for rotating and translating the holding means;
a respective seat positioned in a respective predetermined location along the respective trajectory for receiving the plural wires of the respective one of the leads;
a respective reference surface positioned adjacent an entrance of the respective seat;
wherein the plural wires of the respective one of the leads are bent adjacent an entrance of the respective seat to be redirected along a respective predetermined direction extending from the respective predetermined location; and
wherein the holding means holds a first length of the plural wires of the respective one of the leads extending beyond the seat in the respective predetermined direction; the apparatus further comprising:
control means for rotating the holding means to twist the plural wires of the respective one of the leads being held along the respective predetermined direction and for translating the holding means to maintain a pull on a further portion of the plural wires of the respective one of the leads against the reference surface during twisting of the plural wires of the respective one of the leads.

2. The apparatus of claim 1 wherein the respective seat and the respective reference surface are portions of a first member temporarily applied to said core.

3. The apparatus of claim 2 further comprising a second member with a respective second reference surface for directing the plural wires of the respective one of the leads along the respective predetermined trajectory.

4. The apparatus of claim 3 wherein the first member is moveable along the axis of the core with respect to the second member from a first position to a second position; the second position being nearer to the core for maintaining the plural wires of the respective one of the leads towards the heads of coils during twisting; and wherein at the second position spacing is formed between heads of the coils and the first member and the plural wires of the respective one of the leads can be disposed along the respective predetermined trajectory located in the spacing.

5. The apparatus of claim 3 wherein:
the first member comprises an annular portion located over heads of coils; and
the second member comprises:
a cylindrical portion nested within the heads of coils, and
a member seat for receiving a portion of the first member.

6. The apparatus of claim 1 wherein:
the respective reference surface is a surface facing the heads of coils protruding from the core;
the respective seat is a passage for the wires located over heads of coils, and the passage direction is perpendicular to the end of the core.

7. The apparatus of claim 1 further comprising a respective restraining member positioned in spacing of bridges of the coils to resist movement of the coils during twisting.

8. The apparatus of claim 2 wherein the respective seat communicates with a passage leading to an access on the periphery of the first member for entrance of the plural wires of the respective one of the leads during manipulating.

9. The apparatus of claim 1 further comprising means for distancing the respective reference surface from the core when manipulating the plural wires of the respective one of the leads to dispose the plural wires of the respective one of the leads along the respective predetermined trajectory and for moving the respective reference surface towards said core prior to starting twisting of the plural wires of the respective one of the leads.

10. The apparatus of claim 7 further comprising means for guiding each respective restraining member in a radial direction of the core to position a respective portion of each respective restraining member in the spacing of the bridges adjacent to an end face of the core;
means for moving the restraining members in the radial direction;
means for rotating the means for moving in order to collectively move the restraining members in the radial direction with a synchronized motion; and
means for supporting the means for moving and the means for rotating.

11. The apparatus of claim 10 comprising at least a first guide member for guiding at least a first series of respective restraining members in the radial direction of the core to position the respective portions of the first series of respective restraining members in the spacing of the bridges adjacent to at least an end face of the core;
a first drive member for moving the first series of respective restraining members in the radial direction;
means for rotating the first drive member in order to collectively move the first series of respective restraining members in the radial direction;
a second guide member for guiding a second series of respective restraining members in the radial direction of the core to position portions of the second series of respective restraining members in the spacing of the bridges of the coils adjacent to a second end face of the core;
a second drive member for moving the second series of respective restraining members in the radial direction; and
means for rotating the second drive member in order to collectively move the second series of restraining members in the radial direction.

12. The apparatus of claim 11 wherein:
- a respective restraining member of the first series is provided with a respective engaging portion for engaging a cam surface of the first drive member in the radial direction when rotating the first drive member; and
- a respective restraining member of the second series is provided with a respective engaging portion for engaging a cam surface of the second drive member in order to move in the radial direction when rotating the second drive member.

13. The apparatus of claim 11 wherein the means for supporting supports the first drive member and the second drive member, and allows rotation of the first drive member and the second drive member.

14. The apparatus of claim 11 wherein the first drive member is connected by an arm to an engagement member; the second drive member is connected by an arm to the engagement member; and the engagement member is pushed along a path to rotate the means for rotating.

* * * * *